(12) United States Patent
Ueno et al.

(10) Patent No.: US 8,441,812 B2
(45) Date of Patent: May 14, 2013

(54) SERIES RESONANT CONVERTER HAVING A CIRCUIT CONFIGURATION THAT PREVENTS LEADING CURRENT

(75) Inventors: Shingo Ueno, Tokyo (JP); Atsushi Saito, Tokyo (JP); Kiyomi Watanabe, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 563 days.

(21) Appl. No.: 12/470,192

(22) Filed: May 21, 2009

(65) Prior Publication Data

US 2009/0290389 A1 Nov. 26, 2009

(30) Foreign Application Priority Data

May 23, 2008 (JP) ................................. 2008-135357
Jul. 11, 2008 (JP) ................................. 2008-181886

(51) Int. Cl.
*H02M 3/335* (2006.01)
(52) U.S. Cl.
USPC .......... 363/21.02; 363/16; 363/17; 363/21.03
(58) Field of Classification Search ............... 363/21.02, 363/21.03, 16, 17
See application file for complete search history.

(56) References Cited

U.S. PATENT DOCUMENTS

| | | | |
|---|---|---|---|
| 5,715,155 A * | 2/1998 | Shahani et al. | 363/132 |
| 6,075,715 A * | 6/2000 | Maehara et al. | 363/37 |
| 6,081,438 A * | 6/2000 | Saint-Pierre et al. | 363/95 |
| 6,215,675 B1 * | 4/2001 | Laeuffer et al. | 363/17 |
| 6,442,047 B1 * | 8/2002 | Cohen | 363/17 |
| 6,483,731 B1 * | 11/2002 | Isurin et al. | 363/125 |
| 6,711,533 B1 * | 3/2004 | Aymard et al. | 703/13 |
| 6,834,000 B2 * | 12/2004 | Croulard et al. | 363/16 |
| 6,934,167 B2 * | 8/2005 | Jang et al. | 363/21.02 |
| 7,116,012 B2 * | 10/2006 | Kajouke et al. | 307/64 |

(Continued)

FOREIGN PATENT DOCUMENTS

| | | |
|---|---|---|
| JP | 2001-112253 A | 4/2001 |
| JP | 2003-153532 | 5/2003 |

(Continued)

OTHER PUBLICATIONS

Official Communication issued to JP Application No. 2008-181886, mailed Aug. 7, 2012.

(Continued)

*Primary Examiner* — Adolf Berhane
*Assistant Examiner* — Gary Nash
(74) *Attorney, Agent, or Firm* — Hoffmann & Baron, LLP

(57) ABSTRACT

A series resonant converter of the present invention includes an inverter circuit having at least a pair of a first and second switching device connected between two input terminals, a transformer having a primary winding and a secondary winding connected to the inverter circuit, a first and second resonant capacitor connected to a secondary side of the transformer and connected in series to each other between two output terminals, a first and second unidirectional device connected in series to each other, and a resonant induction device that is operated along with the first and second resonant capacitor and resonates in series. The first and second unidirectional device are configured such that current does not flow from the first and second resonant capacitor to the input terminal by preventing electric charge of the first and second resonant capacitor from being discharged to a primary side of the transformer.

14 Claims, 9 Drawing Sheets

U.S. PATENT DOCUMENTS

| | | | |
|---|---|---|---|
| 7,136,294 B2 * | 11/2006 | Phadke et al. | 363/132 |
| 2007/0195561 A1 * | 8/2007 | Suenaga et al. | 363/21.02 |
| 2008/0247194 A1 * | 10/2008 | Ying et al. | 363/17 |
| 2009/0034299 A1 * | 2/2009 | Lev | 363/17 |
| 2009/0154200 A1 * | 6/2009 | Coccia et al. | 363/21.02 |

FOREIGN PATENT DOCUMENTS

| | | |
|---|---|---|
| JP | 2003-324956 | 11/2003 |
| JP | 2006-174650 A | 6/2006 |
| JP | 2006-191766 | 7/2006 |
| JP | 2007-24789 A | 10/2007 |
| JP | 2007-274789 A | 10/2007 |

OTHER PUBLICATIONS

Official Communication issued to JP Application No. 2008-181886, mailed May 22, 2012.

* cited by examiner

SERIES RESONANT CONVERTER HAVING A CIRCUIT CONFIGURATION THAT PREVENTS LEADING CURRENT

CROSS-REFERENCE TO RELATED APPLICATIONS

The present application claims the benefit of Japanese Patent Application No. 2008-135357, filed on May 23, 2008 and Japanese Patent Application No. 2008-181886, filed on Jul. 11, 2008, the subject matters of which are hereby incorporated herein by reference in their entirety.

FIELD OF THE INVENTION

The present invention relates to a series resonant converter which uses series resonant effect of inductance and capacitance.

BACKGROUND OF THE INVENTION

A series resonant converter using series resonance of an inductance of a resonance inductor and a capacitor of a resonant capacitor is commonly used as a converter with high power conversion efficiency. A series resonant converter is mainly divided into a current mode series resonant converter in which a resonant capacitor is connected in series with a primary winding or a secondary winding of a transformer and a voltage mode series resonant converter in which a resonant capacitor is connected in parallel with a primary winding or a secondary winding of a transformer. A current type series resonant converter has been disclosed in, for example, Japanese Unexamined Patent Application Publication No. 2003-324956. A voltage type series resonant converter has been disclosed in, for example, Japanese Unexamined Patent Application Publication No. 2003-153532.

Such a series resonant converter can reduce switching losses of a switching device by zero current switching (ZCS) in which a switching device performs switching when a current flowing in the switching device is near zero and by the switching device performing switching in a lagging current mode. However, in such a series resonant converter, it has been suggested that there is power loss caused by energy of a resonant circuit returning to the DC power supply via a feedback diode connected in parallel with the switching device. In other words, a feedback current to the DC power supply improves power efficiency in that it returns the energy to the DC power supply, but the energy supplied from the DC power supply to the resonant circuit is returned to the DC current, which causes unnecessary loss of circuit caused by the current which has not been supplied to a load device.

Furthermore, in the series resonant converter such as that described above, specifically, when a voltage charged in a resonant capacitor by series resonance is higher than that of the DC current, the energy accumulated in the resonant capacitor, accompanied with turning off one switching device which was turned on, becomes current that flows to a feedback diode connected in parallel with the switching device which was turned on. Therefore, at the moment when the other switching device turns on, reverse voltage is applied to the feedback diode flowing feedback current, and precipitous recovery current (reverse recovery current) flows in a recovering time until a reverse direction blocking characteristics of the feedback diode is recovered, which generates power loss and noise.

In addition, a technology with respect to a voltage type series resonant converter disclosed in Japanese Unexamined Patent Application Publication No. 2006-191766 is as follows. The voltage type series resonant converter uses resonance of a resonant inductor and a resonant capacitor connected in parallel with a primary side of a transformer, and the resonant capacitor is charged more than a DC power supply voltage. A charge of the resonant capacitor is returned to a DC power supply and recovery current flows to a feedback diode. In this circuit, two capacitors are connected in parallel with each of the two diodes of a bridge rectifier circuit that is composed of four diodes. However, these capacitors are not selected so as to resonate in series with a resonant inductor. This voltage type series resonant converter realizes different output characteristics in which a rectifier circuit functions as a voltage-doubler rectifier circuit when output current is small and as a bridge rectifier circuit when output current is large.

Thus, in a conventional series resonant converter, in every half-cycle time of a switching cycle of a switching device, energy corresponding to resonant energy flows in a feedback diode as a large feedback current. Therefore, current which is not supplied to a load device becomes large, which generates unnecessary circuit loss.

In addition, in every half-cycle time of a switching cycle of a switching device, since recovery current flowing in a reverse direction is generated at a feedback diode, not only power loss of a feedback diode is increased, but also unnecessary turn-on power loss is generated in a switching device in an amount as much as the recovery current flowing, thereby reducing power efficiency of a resonant converter. Moreover, since such recovery current has a sharp waveform, it has a deficiency in generating noise even if its current waveform is rendered to be a sine wave form by resonance.

SUMMARY OF THE INVENTION

A series resonant converter according to the present invention is a circuit configuration in which current returning from a resonant capacitor to a DC power supply, i.e. leading current, does not flow. Such a series resonant converter includes an inverter circuit including at least a pair of a first switching device and a second switching device connected between two input terminals, a transformer of which a primary winding is connected to the inverter circuit, a resonant capacitor unit connected to one end of a secondary winding of the transformer, a unidirectional device unit connected to the other end of the secondary winding of the transformer, and a resonant induction device that is operated along with the resonant capacitor unit and resonates in series.

The resonant capacitor unit includes a first resonant capacitor and a second resonant capacitor connected in series to each other between two output terminals, and a series connection point of these resonant capacitors is connected to one end of the secondary winding of the transformer. The unidirectional device unit includes a first unidirectional device and a second unidirectional device connected in series to each other between two output terminals, and a series connection point of these unidirectional devices is connected to the other end of the secondary winding of the transformer.

By configuring in the abovementioned circuit structure, the first switching device and the second switching device alternately turn on and off, and the inverter circuit converts DC power supply inputted from the input terminal and supplies alternating voltage to the output terminal via the transformer. The unidirectional device unit (a first unidirectional device and a second unidirectional device) prevents electric charge of a resonant capacitor unit (a first resonant capacitor and a second resonant capacitor) from being discharged to a primary side of a transformer. Thus, current is prevented from being returned to the input terminal side from a resonant capacitor unit.

Furthermore, as a preferable circuit for preventing the occurrence of recovery current and reducing power loss, a inverter circuit of a series resonant converter according to the present invention includes a first feedback diode arranged in parallel with a first switching device and having a reversed polarity that is opposite to that of a first switching device, and a second feedback diode arranged in parallel with a second switching device and having a reversed polarity that is opposite to that of a second switching device.

In addition, in the series resonant converter according to the present invention, it is preferable that a reverse charge control device for preventing reverse direction charge of a first resonant capacitor and a second resonant capacitor is connected in parallel with a first resonant capacitor and a second resonant capacitor, respectively.

Moreover, in the series resonant converter according to the present invention, in order to reduce ripple voltage, it is preferable that a smoothing capacitor having sufficiently larger capacitance than a first resonant capacitor or a second resonant capacitor is connected in parallel with a series circuit of a first unidirectional device and a second unidirectional device.

In the series resonant converter according to the present invention, a resonant inductor imparting a portion of or the entire inductance of a resonant induction device can be connected in series with a first winding or a second winding of a transformer.

Furthermore, a leakage inductance caused by leakage flux between a first winding and a second winding of a transformer is used as a portion of or the entire inductance of a resonant induction device.

DETAILED DESCRIPTION OF THE INVENTION

In the following, embodiments of the present invention are explained in detail with reference to the drawings. It should be noted that the present invention is not limited to the embodiments shown below. In the present specification and figures, the same reference symbols are used for identical or similar elements.

First Embodiment

Figure 1:
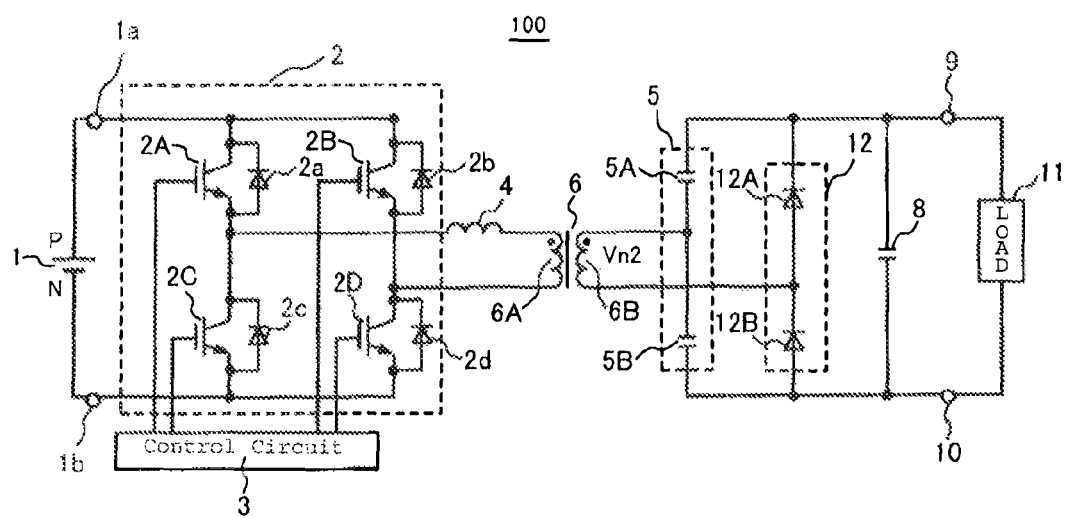
FIG. 1 is a circuit diagram showing a first series resonant converter according to a first embodiment of the present invention.

A series resonant converter according to a first embodiment of the present invention is described with reference to FIGS. 1 to 4. FIG. 1 shows a circuit structure of a first series resonance type converter 100 of the present invention. The series resonant converter 100 includes a DC power supply 1, an inverter circuit 2, a control circuit 3, a resonant inductor 4, a resonant capacitor unit 5, a transformer 6 having a primary winding 6A and a secondary winding 6B, a unidirectional device unit 12, a smoothing capacitor 8, and output terminals 9 and 10. The primary winding 6A of the transformer 6 is connected to an inverter circuit 2 side via the resonant inductor 4, which is connected in series. One end of the secondary winding 6B of the transformer 6 is connected to the resonant capacitor unit 5 side and the other end of the secondary winding 6B is connected to the unidirectional device unit 12 side. A load 11 such as a common installation device including a vacuum device and a power supply for communication is connected to the output terminals 9 and 10.

The DC power supply 1 is connected between two input terminals 1a and 1b. For example, the DC power supply 1 is a common device including a rectifier circuit that rectifies a single-phase or a three-phase alternating current so as to convert it to DC power and a filter circuit that smoothes the DC power. Alternately, the DC power supply 1 may be an accumulator or a power generator.

The inverter circuit 2 includes a full bridge circuit configuration in which two switching device arms are connected in parallel. Two switching devices 2A and 2C are connected in series with the one switching device arm, and two switching devices 2B and 2D are connected in series with the other switching device arm. The one end of the switching devices 2A and 2B are connected to the input terminal 1a, and the one end of the switching devices 2C and 2D are connected to the input terminal 1b. Semiconductor devices such as FET or IGBT are used for the switching devices 2A, 2B, 2C, and 2D.

Feedback diodes 2a, 2b, 2c, and 2d are connected in parallel, respectively, in polarity opposite to those of the switching devices 2A, 2B, 2C, and 2D. Cathodes of the feedback diodes 2a and 2b are connected to the input terminal 1a, and anodes of the feedback diodes 2c and 2d are connected to the input terminal 1b. These feedback diodes 2a to 2d may be diodes connected in parallel exteriorly and diodes formed interiorly in each of the switching devices 2A to 2D. In a case in which the switching devices 2A to 2D are FET, interior diodes that FET includes can be used as the feedback diodes 2a to 2d. It should be noted that most semiconductor devices such as common FET, IGBT, and the like have an internal diode built-in.

In addition, there may be no feedback diodes 2a, 2b, 2c, and 2d. In a case in which a pair of the switching devices 2A and 2D or a pair of the switching devices 2B and 2C is controlled so as to be turned off after current flowing in the resonant inductor 4 becomes zero, electromagnetic energy (hereinafter, referred to as energy) is not accumulated in the resonant inductor 4. Therefore, the feedback diodes 2a, 2b, 2c, and 2d are not necessary in principle.

The control circuit 3 allows the pair of the switching devices 2A and 2d and the pair of the switching devices 2B and 2C to be turned on/off alternately with a predetermined frequency (for example, several kHz to tens of kHz) and a predetermined pulse width. Zero current switching (ZCS), which allows the switching device to be turned on and off when current of the switching device is almost zero, reduces switching losses upon turning on and off of the switching devices 2A, 2B, 2C, and 2D. In order to realize ZCS in the switching devices 2A, 2B, 2C, and 2D, it is basically preferred that the ON duration is a half cycle $(\pi(LC)^{1/2})$ of a resonance frequency, which is defined by the resonant inductor 4, and the first resonant capacitor 5A and the second resonant capacitor 5B.

As a control method that satisfies these conditions, there is a frequency control method for changing a repetition frequency with a constant ON duration and a half cycle $(\pi(LC)^{1/2})$ of a resonance frequency, a method for changing voltage of the DC power supply 1 so as to control input voltage of the inverter circuit 2, or the like. For example, lengths of the ON durations of the pair of the switching devices 2A and 2D and the pair of the switching devices 2B and 2C are fixed so as to be the same as that of a semi-cycle of the resonance frequency, and these switching devices are operated at a length of more than a single cycle of the resonance frequency. That is, the control circuit 3 operates the switching devices 2A and 2D and the switching devices 2B and 2C with a drive frequency (a conversion frequency of the inverter circuit 2) below a resonance frequency defined by the resonant inductor 4 and the first resonant capacitor 5A and the second resonant capacitor 5B.

In a case in which each of the ON durations of the pair of the switching devices 2A and 2D and the pair of the switching devices 2B and 2C is fixed to a semi-cycle of the resonant frequency so as to control thereof, the switching devices 2A and 2D or the switching devices 2B and 2C is turned off under a condition in which almost all the energy accumulated in the resonant inductor 4 is discharged. Therefore, after these switching devices are turned off, energy is not accumulated in the resonant inductor 4. In this case, since it is not necessary to provide a current path in which resonant current flowing in the resonant inductor 4 is conducted in the feedback diodes $2a$ to $2d$. Therefore, there may be no feedback diodes $2a$ to $2d$.

In a case in which the switching devices 2A, 2B, 2C, and 2D are turned off while resonant current is flowing, various well-known methods, such as a pulse width control method or frequency control method, or a combined control method of the pulse width control and frequency control, can be employed. In a case in which each of the ON durations of these switching devices is shortened more than that of a semi-cycle of the resonance frequency, the switching devices 2A to 2D are turned off under a condition that energy is accumulated in the resonant inductor 4. Therefore, it is preferable to provide feedback diodes $2a$ to $2d$ so as to discharge the energy accumulated in the resonant inductor 4.

Under a condition that the energy is accumulated in the resonance inductor 4, for example, in a case where the switching devices 2A and 2D or the switching devices 2B and 2C are turned off while all of the switching device 2A to 2D are turned off, the energy accumulated in the resonant inductor 4 flows as feedback current returning to the DC power supply 1 via the feedback diodes $2b$ and $2c$ or the feedback diodes $2a$ and $2d$, and electric power is supplied to the load 11 via the transformer 6 and the output terminals 9 and 10.

The control circuit 3 may be controlled so that the switching devices 2A and 2D or the switching devices 2B and 2C, ie. the switching devices in a pair, are not turned off simultaneously. In other words, the control circuit 3 may be controlled so that an ON duration of the switching device 2A is different from that of the switching device 2D or an ON duration of the switching device 2B is different from that of the switching device 2C. For example, after either one of the pair of the switching devices 2A and 2D or one of the pair of the switching devices 2B and 2C is turned on, the switching device 2D or the switching device 2C is controlled so as to be turned off at an earlier timing than or the switching device 2A,or the switching device 2B which shortens the ON duration, for example, more than a semi-cycle of the resonance frequency.

In this case, the current flowed by the energy of the resonant inductor 4 flows in a current path composed of the resonant inductor 4, the primary winding 6A of the transformer 6, the feedback diode $2b$, and the switching device 2A, or a current path composed of the resonant inductor 4, the feedback diode $2a$, the switching device 2B, and the primary winding 6A of the transformer 6. Thus, since a path of current flowed by the energy of the resonant inductor 4 is configured to include the load 11 via the switching device 2A and the feedback diode $2b$ or the switching device 2B and the feedback diode $2a$, and the transformer 6, the energy of the resonant inductor 4 between this path is supplied to the load 11.

In FIG. 1, the resonant inductor 4 is connected in series with the primary winding 6A of the transformer 6. In FIG. 1, although the resonant inductor 4 is shown as a separate component from the transformer 4, the resonant inductor 4 can be eliminated by way of using a leakage inductance Lr of the transformer 6, or alternately, an inductance value of the resonant inductor 4 can be decremented by the leakage inductance Lr. As such, a resonant induction device that displays the inductance necessary to achieve the desired series resonance can be realized by a configuration mainly including the resonant inductor 4, a configuration without using a separate inductor utilizing a desired size of leakage inductance Lr of the transformer 6, or a configuration in which the resonant inductor 4 is combined with leakage inductance Lr of the transformer 6.

The resonant capacitor unit 5 includes a first resonant capacitor 5A and a second resonant capacitor 5B, which are connected in series to each other. The first resonant capacitor 5A and the second resonant capacitor 5B are connected in series to each other between the two output terminals 9 and 10. A connection point between the first resonant capacitor 5A and the second resonant capacitor 5B is connected to one end of the secondary winding 6B of the transformer 6.

A unidirectional device unit 12 is connected in series with the resonant capacitor 5. The unidirectional device unit 12 includes a first diode 12A and a second diode 12B, which are connected in series to each other. The first diode 12A and the second diode 12B are connected to the other end of the second winding 6B of the transformer 6 from a connection point between the first diode 12A and the second diode 12B, which are connected in series to each other between the two output terminals 9 and 10. Since the first resonant capacitor 5A and the second resonant capacitor 5B are configured to be nearly identical in capacitance, these capacitors have nearly the same characteristics.

In the transformer 6, a ratio of the winding number of the secondary winding 6B to the primary winding 6A is set to n. Dots attached to the primary winding 6A and the secondary winding 6B indicate the polarity thereof. The smoothing capacitor 8 includes a filtering function for reducing ripple voltage. Since resonant capacitors 5A and 5B of small capacitance are used and connected in series equivalently for DC, capacitance becomes half, and a filtering function thereof cannot be expected as a result. Therefore, it is preferable that the smoothing capacitor 8 is made to have capacitance at least several to a hundred times the size of a resonant capacitor. The load 11 is connected between the output terminals 9 and 10.

Although the feedback diodes $2a$ to $2d$ are not indispensable elements for a basic operation of the present invention, they are preferable provided. When described in detail, as mentioned above, in a case in which the ON durations of these switching devices is shortened more than that of a semi-cycle of the resonance frequency, the switching devices 2A to 2D are turned off under a condition that energy is accumulated in the resonant inductor 4. Furthermore, in an actual circuit, even if these switching devices are turned off while resonant current is zero, it is possible to block excitation current of the transformer 6 which may flow slightly along with resonant current. In addition, for a load such as a vacuum device in which load short may occur suddenly, the first and second switching devices may be turned off in an emergency for over-current limitation, while resonant current is flowing. Considering these cases, it is preferable to provide a feedback diode in the inverter circuit 2 in order to provide a current path for flowing current by energy accumulated in a resonant inductor.

In addition, one end of the resonant inductor 4 may be connected with the primary winding 6A of the transformer 6 and the other end of the resonant inductor 4 may be connected with a connection point between the switching device 2B and the switching device 2D. Furthermore, the resonant inductor 4 may be connected with a secondary winding side of the transformer 6. In this case, one end of the resonant inductor 4 may be connected with a secondary winding 6B of the transformer 6, and the other end of the resonant inductor 4 may be connected with a connection point between the first resonant capacitors 5A and 5B or a connection point between the first and second diodes 12A and 12B.

Before explaining an overall operation of the series resonant converter 100, substantial differences between the present invention and conventional circuits are described briefly below. Upon switching a pair of the switching devices 2A and 2D and a pair of the switching devices 2B and 2C, electric charge energized in the resonant capacitor unit 5 by resonance operation is, as equivalent voltage, at least the voltage of the DC power supply 1, and at most double the voltage of the DC power supply 1. Thus, the electric charge charged in the resonant capacitor unit 5 is not discharged to the primary winding side 6A of the transformer 6 because of operation of the unidirectional device unit 12. Thus, current is not returned from the first resonant capacitor 5A and the second resonant capacitor 5B to the input terminals 1$a$ and 1$b$ sides. Therefore, this fact reduces power loss.

Regarding the series resonant converter 100 according to the present invention, it is preferable to select the inductance of the resonant induction device (4), the capacitance of the first resonant capacitor 5A, and the capacitance of the second resonant capacitor 5B so that inductance of the resonant induction device (4) and additive capacitance which adds capacitance of the first resonant capacitor 5A and the second resonant capacitor 5B are resonated in series with a resonance frequency which is substantially equal to a conversion frequency of the inverter circuit 2. A desired output can be obtained using the resonance between the resonant induction device (4) and the first resonant capacitor 5A and the second resonant capacitor 5B. Furthermore, after current flowing in the resonant induction device (4) becomes zero, the first switching devices (2A, 2D) or the second switching devices (2C, 2B) can be turned off.

It is preferable that, the first switching devices (2A, 2D) and the second switching devices (2C, 2B) of the series resonant converter according to the present invention are operated such that operation of the inverter circuit is below the resonance frequency fixed by the resonant induction device (4) and the first resonant capacitor 5A and the second resonant capacitor 5B. After all of the energy accumulated in the resonant induction device (4) is discharged, the first switching devices (2A, 2D) or the second switching devices (2C, 2B) can be turned off. In this case, current utilizing the resonant induction device (4) as a energy source flows, which can reduce power loss.

In the present invention, which is different from a conventional circuit, when the switching devices 2A and 2D are turned on simultaneously, for example, since a value of the switching current starts with zero, there is no turn-on loss. Furthermore, for example, when the switching devices 2A and 2D are turned off at a point in time when current flowing in the resonant inductor 4 is almost zero, the turn-off loss is minimized, which can realize ZCS.

As described above, the circuit according to the present invention can allow feedback current from the resonant capacitor unit 5 to the DC power supply 1 to be substantially zero. On the other hand, even in a case in which the switching devices 2A and 2D are turned off when current flowing in the resonant inductor 4 is not zero, since it is different from a conventional circuit, feedback current from the resonant capacitor unit 5 to the DC power supply 1 is substantially zero.

It should be noted that, although feedback current by the energy accumulated in the resonant inductor 4 flows toward the DC current 1 via the load 11 in the secondary side, feedback diodes, which are conductive, are not feedback diodes connected in parallel with the switching devices 2A and 2D, which are turned off, but are the feedback diodes 2$b$ and 2$c$ connected in parallel with the switching devices 2B and 2C, which are subsequently turned on. Therefore, even if the switching devices 2B and 2C are subsequently turned on, since the feedback diodes 2$a$ and 2$d$ are not conductive, it does not produce a recovery phenomenon. That is, since there is only a mode in which lagging current flows in the feedback diodes 2$a$, 2$b$, 2$c$, and 2$d$, recovery current never flows in these feedback diodes without the DC voltage of the DC power supply 1 as reverse voltage being applied to the feedback diodes. Thus, upon switching the switching devices 2A to 2D, recovery loss never occurs in the feedback diodes 2$a$ to 2$d$ and noise is not easily generated.

In the resonant capacitor unit 5, the first resonant capacitor 5A and the second resonant capacitor 5B are connected in series to each other. Therefore, if both the capacitance of the first resonant capacitor 5A and the second resonant capacitor 5B are made to be equal to each other, of which values are C22, a value of the capacitance of the equivalent resonant capacitor unit 5 becomes double the capacitance (the capacitance is now equal to (2×C22)).

In the resonance operation based on the converted value C on the primary side of the transformer 6 which is the additive capacitance (2×C22) which adds capacitance of the first resonant capacitor 5A and the second resonant capacitor 5B and the inductance L of the resonant inductor 4, the resonance frequency Fr is represented from a well-known formula as $Fr = 1/2(2\pi(LC)^{1/2})$.

In a case in which the resonance frequency Fr roughly corresponds to a conversion frequency Fs of the inverter circuit 2, voltages of the first resonant capacitor 5A and the second resonant capacitor 5B are reverse phases to each other, and change up to voltage of amplitude (2×Vn2), which is equal to double the voltage Vn2 of the secondary winding 6B of the transformer 6 from 0 V equivalently. Therefore, since the voltages of the first resonant capacitor 5A and the second resonant capacitor 5B are opposite phases from each other with identical amplitudes, a value of a voltage in which charge-discharge voltage of the ends of the first resonant capacitor 5A and the second resonant capacitor 5B becomes constant.

Figure 2:
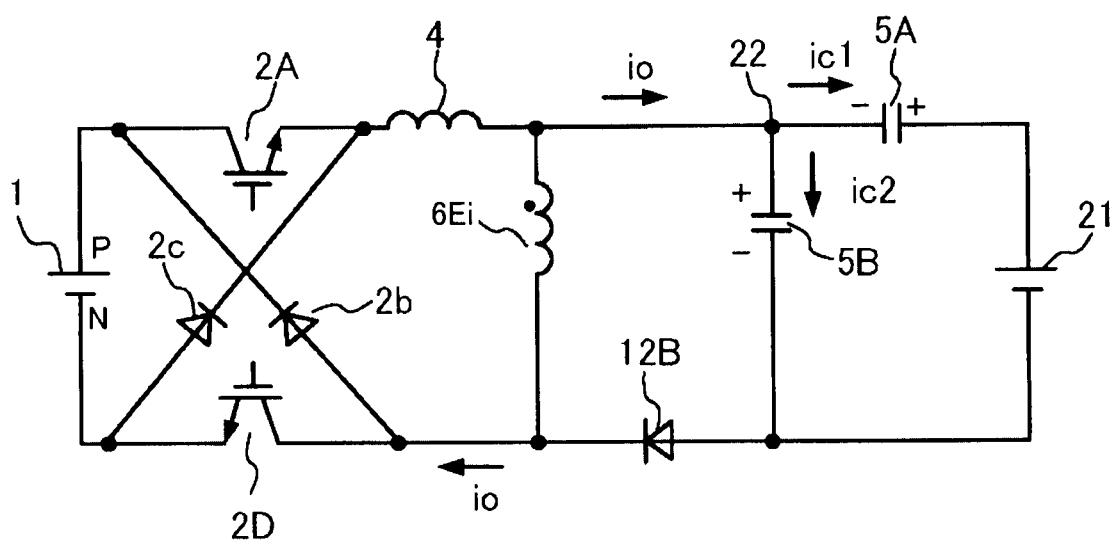
FIG. 2 is a circuit diagram showing a first equivalent circuit of the series resonant converter of FIG. 1.
Figure 4:
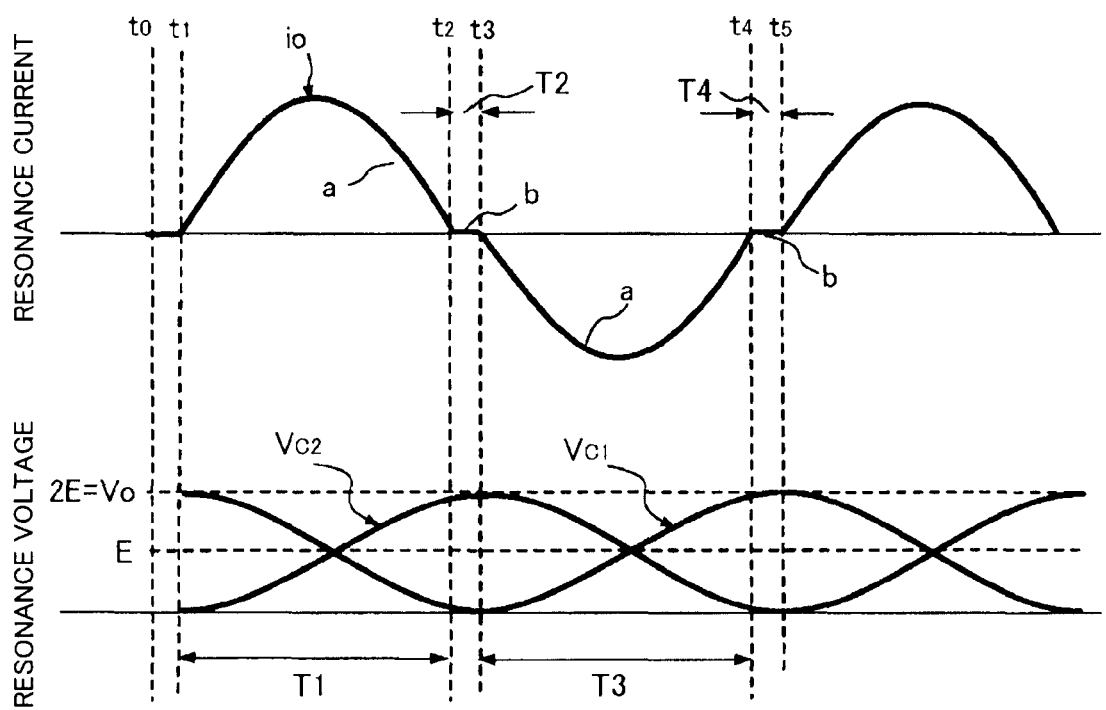
FIG. 4 is a waveform diagram showing a resonant current waveform and a voltage waveform illustrating a series resonant converter of FIG. 1.

Next, an operation of the first series resonant converter 100 according to the present invention shown in FIG. 1 is explained. For ease of understanding, an equivalent circuit with duration T1 during which the switching devices 2A and 2D are ON together in FIG. 4 is shown in FIG. 2. FIG. 2 shows an ideal transformer with a ratio of winding number of the primary winding 6A to the secondary winding 6B of the transformer 6 being 1 and with excitation inductance 6Ei being infinite. Therefore, the circuit on the secondary side of the transformer 6 is equivalently converted to the circuit of the primary side of the transformer 6.

As described above, since the voltage in which the voltages of the first and second resonant capacitors 5A and 5B are added to each other becomes constant, if DC output voltage is nearly constant, an accumulator 21 of voltage Vo is equivalently connected to the output terminals 9 and 10. A configuration is made such that the inverter circuit 2 performs switching operations with an ON duration of a semi-cycle $(\pi(LC)^{1/2})$ of a resonance frequency with the conversion frequency Fs, which is nearly equal to the resonance frequency Fr.

FIG. 4 shows an example of a waveform of a resonant current io flowing in the resonant inductor 4 in FIG. 2 and an example of a waveform of voltages Vc1 and Vc2 of the first and second resonant capacitors 5A and 5B, respectively. The forward direction of the resonant current io is shown as the arrow direction of the io shown in FIG. 2 that flows from the DC power supply 1 to the accumulator 21. At the time t0 in FIG. 4, all of the switching devices 2A to 2D are turned off, the first resonant capacitor 5A is charged to Vo (2E) with the polarity shown in the figure, and the second resonant capacitor 5B is 0 V. It should be noted that E is a value of the DC voltage of the DC power supply 1.

As shown in FIG. 2, during the duration T1 from the time t1 to the time t2 in which the switching devices 2A and 2D are ON together, the resonant current io flows in the forward direction from a positive terminal P of the DC power supply 1 via the switching device 2A and the resonant inductor 4. The resonant current io is divided into ic1 and ic2 at a connection point 22 between the first and second resonant capacitors 5A and 5B, and joins together at the anode side of the second diode 12B so as to be the resonant current io again. Regarding a current path at this time, a first current path in which the current ic1 flows is composed of the first resonant capacitor 5A, the accumulator 21, and the diode 12B. The first resonant capacitor 5A discharges the overall electric potential, which was charged up to the voltage 2E in the previous semi-cycle by resonance to the accumulator 21. Furthermore, a second current path in which the current ic2 flows is composed of the second resonant capacitor 5B and the diode 12B. The current ic2 charges the resonant capacitor 5B from a voltage of 0 V up until voltage 2E. The resonant current io thus joined together flows into a negative terminal N of the DC power supply 1 via the diode 12B and the switching device 2D. The resonant current io is shown by way of a current portion a of the current waveform shown in FIG. 4.

At a final time t2 in the duration T1, when the switching devices 2A and 2D are turned off, as described above, the voltage of the second resonant capacitor 5B becomes the voltage 2E, which is equal to nearly double the current voltage E of the DC power supply by resonance, and a voltage of the first resonant capacitor 5A becomes roughly 0 V.

It should be noted that, although the resonant current io of the resonant inductor 4 is divided into the first resonant capacitor 5A and the second resonant capacitor 5B as the currents ic1 and ic2, respectively, since the voltage Vo of the equivalent accumulator 21 is nearly constant, a voltage in which charge-discharge voltages of the ends of the first resonant capacitor 5A and the second resonant capacitor 5B becomes nearly constant. That is, a time integration value of charging current of the first resonant capacitor 5A and a time integration value of charging current of the second resonant capacitor 5B are nearly equal to each other.

In addition, a time integration value of discharging current of the first resonant capacitor 5A and a time integration value of discharging current of the second resonant capacitor 5B are nearly equal to each other. Therefore, the resonant current io flowing in the resonant inductor 4 is almost equally divided into the first resonant capacitor 5A and the second resonant capacitor 5B, and thus, the currents ic1 and ic2 become nearly equal to each other.

Since the switching devices 2A and 2D are turned off at the final time t2 of the duration T1 in FIG. 4, and all of the switching devices 2A to 2D are off in the duration T2 until the time t3 at which the switching devices 2B and 2C are turned on, electric power is not supplied from the DC power supply 1 to the load 11 (the accumulator 21).

Furthermore, since the resonant current io becomes zero, energy accumulated in induction of the circuit including the resonant inductor 4 is zero, and thus feedback current does not flow even if the switching devices 2A and 2D are turned off.

Moreover, considering presence of the feedback current from the first resonant capacitor 5A, in the equivalent circuit shown in FIG. 2, all of the polarities of the respective voltages of the first resonant capacitor 5A with roughly a voltage of 0 V, the second resonant capacitor 5B charged up to the voltage 2E, and the equivalent accumulator 21 (load) with the voltage Vo are an orientation inversely biasing the diode 12B. Therefore, there is no path through which the feedback current flows to the DC current 1 side. As a result of this, the resonant current io becomes zero, as shown by the waveform b of the resonant current io in FIG. 4.

In order to explain the zero duration of the resonant current io to be easily understood, the abovementioned description was explained for a the case in which the duration T2 resulted in the switching frequency fs as a conversion frequency of the inverter circuit 2 being slightly lower than the resonance frequency fr, as a case in which the zero duration T2 is not zero; however, the duration T2 may be zero by perfectly matching the switching frequency fs with the resonance frequency fr. The duration T2 may be any time length by lowering the switching frequency fs more than the resonance frequency fr. By controlling the duration, output voltage and the like can be controlled.

An operation in a case in which a switch is turned off while the resonant current is still flowing is explained. In a case in which the switching devices 2A and 2D are turned off at the point in time when the resonant current io is flowing in FIG. 4, for example, at an arbitrary time ta (not shown) lying between the time t1 and the time t2, current flowing in induction of the circuit including the resonant inductor 4 tries to flow in the same direction as the flow used to flow after the time ta.

With reference to FIG. 2, such current joins together at the anode of the diode 12B to flow in the cathode of the diode 12B and returns to the DC power supply 1 via the feedback diodes 2b and 2c connected in parallel with the switching devices 2B and 2C, respectively, which are subsequently turned on, after being divided into the path of the series circuit of the first resonant capacitor 5A and the accumulator 21 and the path of the second resonant capacitor 5B. In this case, although feedback current flows, the charged electric charge of the resonant capacitor unit 5 is not discharged to the primary winding 6A side of the transformer 6 and the discharged current of the resonant capacitor unit 5 is not added to the feedback current. Since the feedback current of this case flows in the feedback diodes 2b and 2c connected in parallel to the switching devices 2B and 2C, respectively, which are subsequently turned on, recovery loss never occurs.

In addition, in a case in which the switching device 2A remains ON but the switching device 2D becomes OFF at the point in time when the resonant current io is flowing in FIG. 4, for example, at an arbitrary time ta (not shown) lying between the time t1 and the time t2, current flowing in induction of the circuit including the resonant inductor 4 flows via the feedback diode 2b.

With reference to FIG. 2, after being divided into the path of the series circuit of the first resonant capacitor 5A and the accumulator 21 and the path of the second resonant capacitor 5B, such current (the current flowing in induction of the circuit including the resonant inductor 4) joins together at the anode of the diode 12B to flow in the cathode of the diode 12B, and flows via the feedback diode 2b and the switching device 2A. Therefore, energy accumulated in the resonant inductor 4 can be supplied to the load 11.

Figure 3:
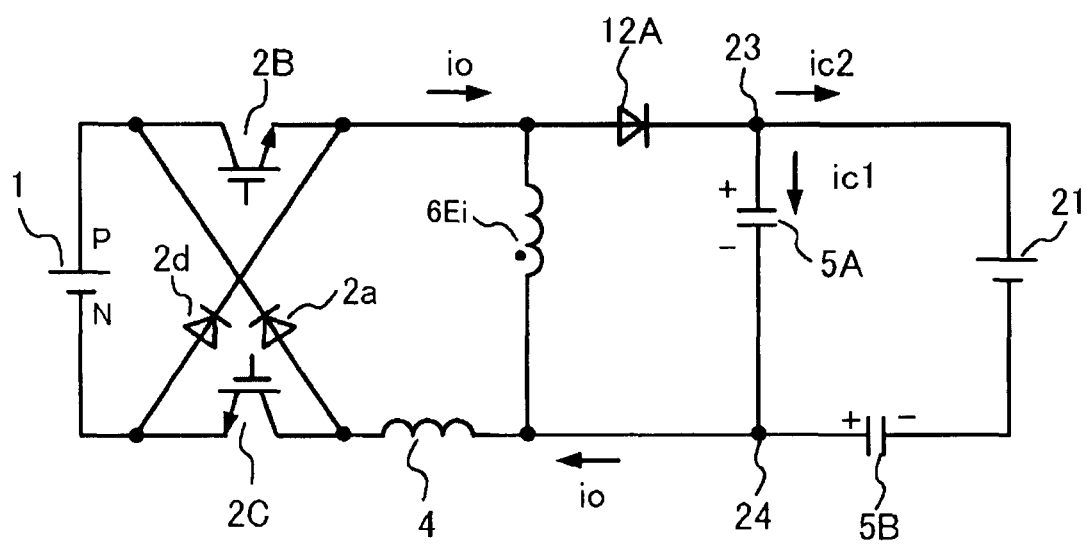
FIG. 3 is a circuit diagram showing a second equivalent circuit of the series resonant converter of FIG. 1.

Next, an equivalent circuit for a duration T3 (the time t3 to the time t4), during which the switching devices 2B and 2C becomes ON together, is shown in FIG. 3. The difference between FIG. 3 and FIG. 2 is in that the switching devices 2B and 2C instead of the switching devices 2A and 2D are turned on, the second resonant capacitor 5B is charged to Vo (2E) with the polarity shown in the figure and the first resonant capacitor 5A is 0 V, and the diode 12A instead of the diode 12B is conductive.

For example, in FIG. 3, when the switching devices 2B and 2C turned ON together, resonant current flows from a positive terminal P of the DC power supply 1 via the switching device 2B and the diode 12A, is divided from the cathode of the diode 12A, flows in a charging path of the first resonant capacitor 5A and a path in which the accumulator 21 and the second resonant capacitor 5B are connected in series to each other, joins together again at a connection point 24 of the first resonant capacitor 5A and the second resonant capacitor 5B, and returns to the negative terminal N of the DC power supply 1 via the resonant inductor 4 and the switching device 2C. In the duration T3, similarly to the duration T1, feedback current toward the DC power supply 1 from the resonant capacitor unit 5 does not flow.

In the DC resonant converter 100 of the first embodiment, although the resonant capacitor unit 5 in which the first and second resonant capacitors 5A and 5B are connected in series is energized to the voltage 2E, which is double the DC voltage E of the DC power supply 1, in every semi-cycle of a frequency of the switching devices 2A and 2D and a frequency of the switching devices 2B and 2C, it never discharges to the DC power supply 1 side due to a function that prevents reverse discharge of the diodes 12A and 12B in the unidirectional device unit 12.

By various control methods, such as a pulse width control method or frequency control method, or a combined control method of the pulse width control and frequency control, even when turning off the switching device in the middle of resonance, since the feedback current does not include current by the discharged electric charge of the first and second resonant capacitors 5A and 5B, and the electric charge of the first and second resonant capacitors 5A and 5B is discharged to the load, the feedback current is smaller than that of conventional circuits. Therefore, in the series resonant converter 100, power loss caused by flow of the feedback current is reduced and power conversion efficiency is improved.

In the series resonant converter according to the present invention, it is possible to select the inductance L of the resonant induction device, the capacitance of the first resonant capacitor, and the capacitance of the second resonant capacitor by the following two conditions: a condition of resonating in series at a frequency equal to a conversion frequency of the inverter circuit 2 according to the inductance L of the resonant induction device and the converted capacitance C, which is generated by converting the additive capacitance which adds capacitance of the first resonant capacitor 5A and the second resonant capacitor 5B to the primary side of the transformer 6; and a condition that an output power Po is satisfied based on the input voltage E and the conversion efficiency η, and a resonance impedance $(L/C)^{1/2}$ determined by the inductance L of the resonant induction device and the converted capacitance which is produced by converting the additive capacitance which adds capacitance of the first resonant capacitor 5A and the second resonant capacitor 5B to the primary side of the transformer 6.

FIG. 9 shows simulation results of FIG. 1. It should be noted that the load 11 is 160Ω. In FIG. 9, (A) shows an output voltage Vo, (B) shows a resonance voltage io flowing in the resonant inductor 4, (C) shows a voltages Vc1 and Vc2 of the first resonant capacitor 5A and the second resonant capacitor 5B, respectively, and (D) shows current Isw of the switching devices 2A and 2D, respectively. The output voltage Vo is 400 V. The resonant current io is nearly an ideal sine wave. The voltages Vc1 and Vc2 of the first resonant capacitor 5A and the second resonant capacitor 5B are reverse phases to each other and are ideal sine waves with amplitude of output power from 0 V to 400 V. The current Isw of the switching devices 2A and 2D are also nearly ideal sine waves.

Second Embodiment

Figure 5:
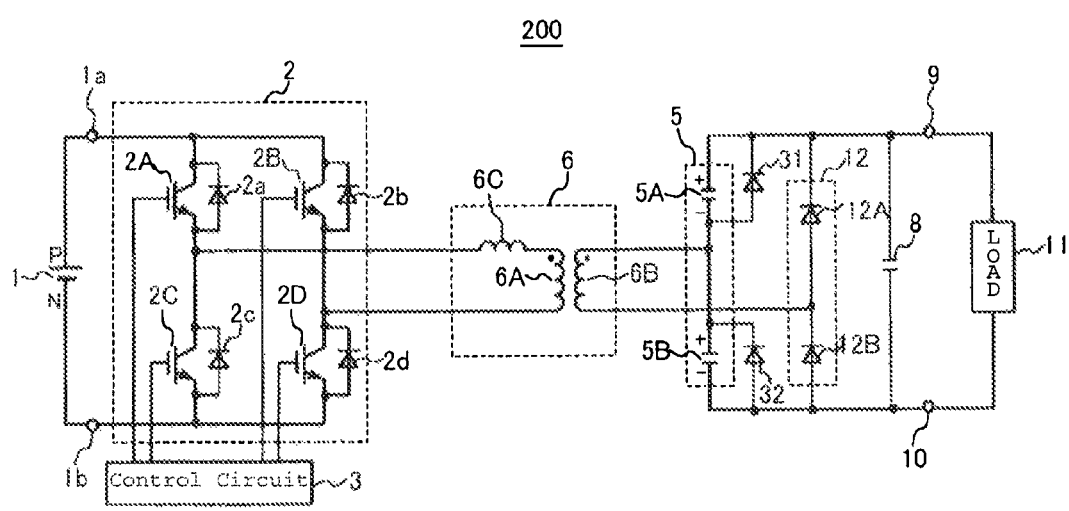
FIG. 5 is a circuit diagram showing a second series resonant converter according to a second embodiment of the present invention.

Next, a series resonant converter 200 according to the second embodiment of the present invention shown in FIG. 5 is described. A point of difference between the second series resonant converter 200 and the first series resonant converter 100 is that a reverse charge control diode 31 is connected in parallel with the first resonant capacitor 5A and a reverse charge control diode 32 is connected in parallel with the second resonant capacitor 5B.

Furthermore, the transformer 6 is a leakage transformer 6 including a leakage inductor 6C without the resonant inductor 4 shown in FIG. 1. That is, in the second embodiment, the leakage inductance 6C of the transformer 6 gives the overall inductance L of the resonant induction device necessary for series resonance. Since the leakage transformer 6 is a combination of the resonant inductor 4 and the transformer 6 in FIG. 1 in principle and is functionally the same as the first series resonant converter shown in FIG. 1, main operations thereof are abbreviated. The operation relating to the reverse charge control diodes 31 and 32, which is different from FIG. 1, is described here.

In the abovementioned operation of the first series resonant converter 100, if minimum voltage values of the first and second resonant capacitors 5A and 5B are equal or greater than 0 V, forward bias does not occur and non-conductive state is constantly maintained, even though the reverse charge control diodes 31 and 32 are added. Therefore, the reverse charge control diodes 31 and 32 do not function.

However, for example, in an abnormal situation such as load short, since series resistance component is lost in a series resonant circuit composed of the resonant inductor and the resonant capacitor, a loss portion disappears. As a result of this, resonant current may rapidly increase in every cycle and output current may rapidly increase. For example, although an output current control circuit of a converter can perform current control in response to this rapid increase in current, the series resonant converter 200 according to the present invention can inherently avoid current an increase in a load short state of the series resonant circuit.

That is, in the series resonant converter 100 according to the first embodiment of the present invention, in a case in which output voltage is reduced and output current is increased, when the overall electric charge of the first and second resonant capacitors 5A and 5B is discharged and then charged in a polarity opposite to the polarity shown in the drawing, this charged voltage with the reversed polarity becomes an initial condition of a subsequent series resonant circuit and, moreover, increases reversed polarity charged voltage of the first and second resonant capacitors 5A and 5B. When repeating this cycle, voltages of the first and second resonant capacitors 5A and 5B increase infinitely in principle.

The reverse charge control diodes 31 and 32 prevent the first and second resonant capacitors 5A and 5B from being charged in a polarity opposite to the polarity shown in the drawing. As a result of this, an initial condition of reversed polarity voltage of the first and second resonant capacitors 5A and 5B for each cycle (ON of the pair of the switching devices 2A and 2D or the pair of the switching devices 2B and 2C) is fixed at zero voltage at a minimum and not charged to be reversed polarity, whereby resonant current can be prevented from being rapidly increased, even in a case of load short.

Furthermore, this additive function of reverse charge control diodes 31 and 32 has the following advantages. In a range in which output current is relatively small, the inductance L of the resonant induction device (the leakage inductance 6C) and capacitance of the first and second resonant capacitors 5A and 5B are selected so that the series resonant converter 200 can operate in the series resonance mode as described above. In this case, the first and second resonant capacitors 5A and 5B, along with the diodes 12A and 12B of the unidirectional device unit 12, configure a voltage-doubler rectifier circuit as a general circuit configuration. Therefore, in a case in which the series resonant converter 200 operates in the series resonance mode, although the amplitude of the output current is controlled, a relatively high output voltage can be obtained.

However, even in a case in which the inductance L of the resonant induction device and capacitance of the first and second resonant capacitors 5A and 5B are selected so that the series resonant converter 200 can operate in the series resonance mode, if load current becomes large, capacitance of the first and second resonant capacitors 5A and 5B becomes insufficient, and the entire electric charge is discharged. As a result of this, if the voltage becomes zero, it becomes unable to function as a capacitor that configures a voltage-doubler rectifier circuit. In a case in which the load current becomes large in the abovementioned manner, the reverse charge control diodes 31 and 32, along with the diodes 12A and 12B of the unidirectional device unit 12, configure a full bridge type rectifier circuit as a general configuration. With this rectifier circuit, large output current can be obtained with low voltage.

Therefore, the series resonant converter 200 can obtain not only DC output that is relatively small output current with high voltage, but also DC output that is relatively large output current with low voltage. Furthermore, since constant electric power output can be obtained by pulse width control or frequency control, due to this fact, it can be understood that the series resonant converter 200 is suitable for a DC power supply of a load device such as a sputtering power supply having a relatively broad output current range and output voltage range from output of small current with high voltage to output of large current with low voltage. Although the description, which is the same as that of the series resonant converter 100 according to the first embodiment, in regards to feedback current is abbreviated, the series resonant converter 200 is of high efficiency and low noise, similarly to the series resonant converter 100.

Third Embodiment

Figure 6:
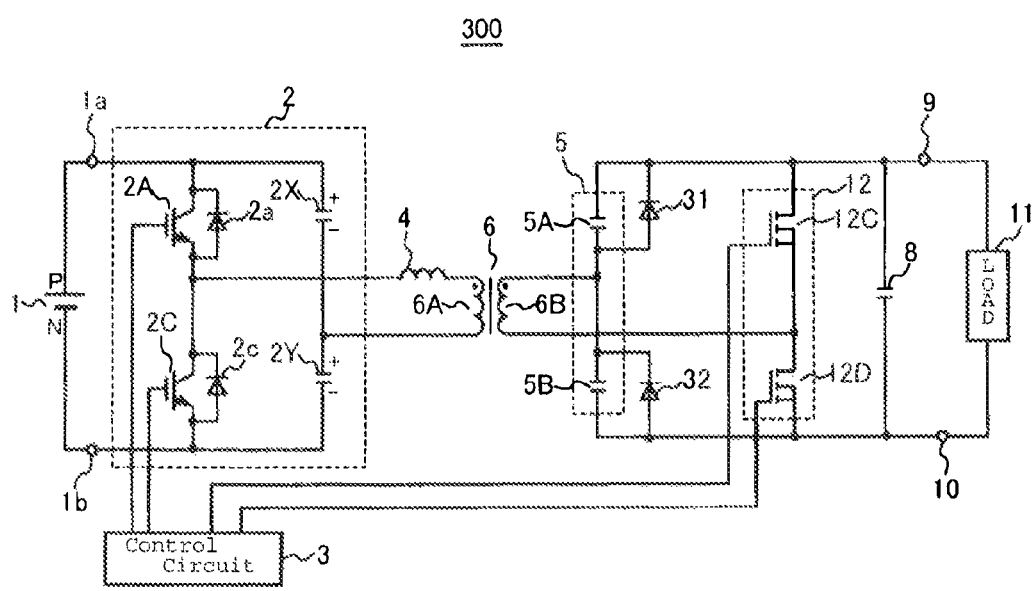
FIG. 6 is a circuit diagram showing a third series resonant converter according to a third embodiment of the present invention.

Next, a series resonant converter 300 according to the third embodiment is described in FIG. 6. A normal half-bridge inverter circuit 2 is used in the series resonant converter 300. It is a half-bridge inverter circuit including a switching device arm connected in series with the two switching devices 2A and 2C, respectively.

In the half-bridge inverter circuit 2, a capacitor 2X is used instead of the switching device 2B and the feedback diodes 2b, and a capacitor 2Y is used instead of the switching device 2D and the feedback diode 2d of the full-bridge inverter circuit 2 in FIG. 1 or 5. Since an inverter circuit with fewer switching devices, as compared to the full-bridge inverter circuit, can be used, simplified control of the switching device can be made.

In the series resonant converter 300, a field-effect transistor (hereinafter referred to as FET) is used as the unidirectional device unit 12. The unidirectional device unit 12 is configured with a so-called synchronous rectification circuit which connects in series with FETs 12D and 12C for rectification. The FET 12D is synchronized with the switching device 2A and turns ON and OFF simultaneously therewith. The FET 12C is synchronized with the switching device 2C and turns ON and OFF simultaneously therewith. FET has a diode function equivalent in a reverse direction and the diode has a characteristic in that internal resistance is reduced when a gate signal is applied to FET. Synchronous rectification is performed using this characteristic.

Although the FET 12D and 12C are controlled by the control circuit 3, regarding the operation for performing rectification and reverse discharge prevention of charged electric charge of the first and second resonant capacitors 5A and 5B, those FETs are nearly identical with the unidirectional device unit 12 of the first and second embodiments. By using FETs with small ON resistance instead of diodes, smaller power loss than the power loss by drop of forward voltage of a diode is possible, which can achieve high efficiency. In should be noted that a leakage inductance of the transformer 6 can be used, even in the third embodiment, as a portion of or the overall inductance of the resonant induction device.

In the series resonant converter 300, when the switching device 2A and FET 12D are simultaneously turned on, a primary side current flows to the negative terminal N of the DC power supply 1 from the positive terminal P of the DC power supply 1 via the switching device 2a, the resonant inductor 4, the primary winding 6A of the transformer 6, and the capacitor 2Y. Furthermore, a secondary side current flows in a first current path composed of the resonant capacitor 5A, the load 11, and FET 12D from the secondary winding 6B of the transformer 6 and discharges the electric charge to the resonant capacitor 5A, and flows in a second current path composed of the resonant capacitor 5B and the FET 12D from the secondary winding 6B and charged the resonant capacitor 5B. At this time, since a drop in the forward voltage of the FET 12D is smaller than that of the diode, power loss can be reduced.

Furthermore, when the switching device 2A and the FET 12D are simultaneously turned on, inductance of such as the resonance inductor 4 flows the feedback current in the same direction as the flow used to flow via the primary winding 6A of the transformer 6, the capacitor 2X, the DC current 1, and the feedback diode 2c. In addition, the secondary side current flows in a first current path composed of the first resonant capacitor 5A, the load 11, and the FET 12D from the secondary winding 6B, and discharges electric charge of the first resonant capacitor 5A, and flows in a second current path composed of the second resonant capacitor 5B and the FET 12D from the secondary winding 6B and discharges the second resonant capacitor 5B. At this time, since the FET 12D is off, the electric charge of the second resonant capacitor 5B is never discharged via the secondary winding 6B of the transformer 6. Therefore, even though voltage of the second resonant capacitor 5B is higher than DC current of the DC power supply 1, the electric charge of the second resonant capacitor 5B is never returned to the DC power supply 1 side via the transformer 6. The same applies to the case in which the switching device 2B and the FET 12C are simultaneously turned on.

In the third embodiment as well, feedback current by the resonant capacitor unit 5 does not flow to the DC power supply 1 side. Therefore, the series resonant converter 300 also reduces power loss caused by feedback current and eliminates power loss and noise caused by recovery current of a feedback diode. In addition, by using FET, loss caused by drop of forward voltage of the unidirectional device unit 12 can be further reduced. In the third embodiment as well, as shown in FIG. 6, charging to a reversed polarity can be prevented by connecting the diodes 31 and 32 in parallel with the first and second resonant capacitors 5A and 5B, respectively.

Fourth Embodiment

Figure 7:
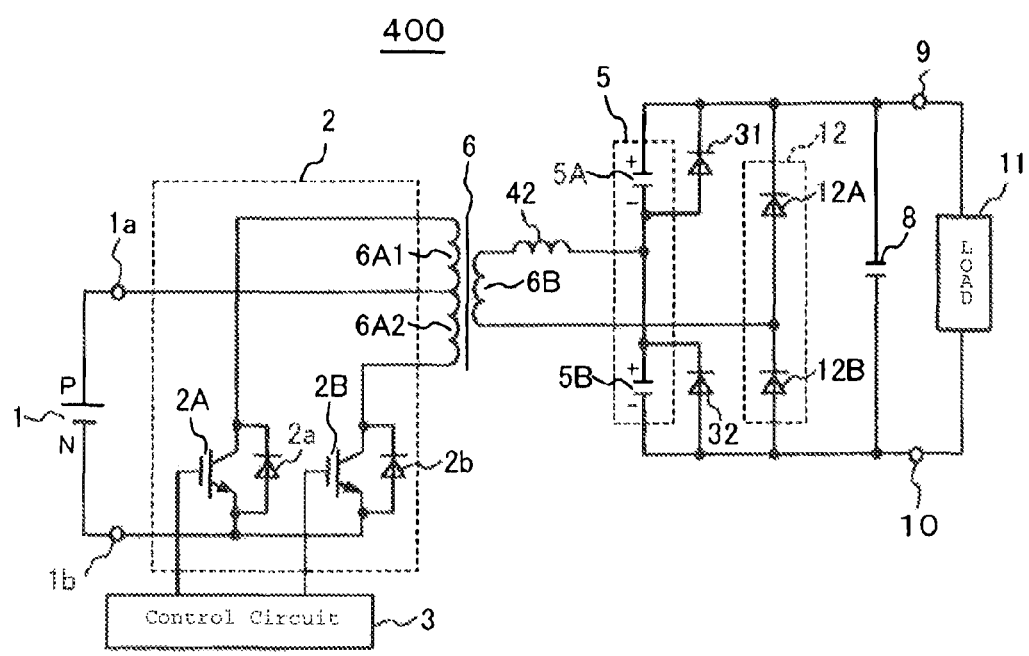
FIG. 7 is a circuit diagram showing a fourth series resonant converter according to a fourth embodiment of the present invention.

A series resonant converter 400 according to the fourth embodiment is shown in FIG. 7. An inverter circuit 2 is configured with a push-pull circuit along with the transformer 6. Since an inverter circuit with fewer switching devices, as compared to the full-bridge inverter circuit, can be used, simplified control of the switching device is possible.

In the series resonant converter 400, the first and second switching devices 2A and 2B are connected with two primary windings 6A1 and 6A2, respectively, and emitter terminals of the switching devices 2A and 2B are connected with the negative terminal N of the DC power supply via an input terminal 1b. The switching devices 2A and 2B are alternately turned on and off by control of the control circuit 3.

Furthermore, the feedback diodes 2a and 2b are connected in anti-parallel with the switching devices 2A and 2B, respectively. It should be noted that, similarly to the first to third embodiments, the feedback diodes 2a and 2b may be formed internally in each of the diodes or switching devices 2A and 2B which are externally connected in parallel. A connection point (an intermediate tap) between the primary windings 6A1 and 6A2 of the transformer 6 is connected to the positive terminal P of the DC power supply 1 via the input terminal 1a.

A resonant inductor 42 is connected in series with the secondary winding 6B of the transformer. Furthermore, the resonant inductor can be connected in series with the primary windings 6A1 and 6A2. In this case, the resonant inductor should be an inductor including two windings, which makes the configuration more complicated than the case in which the resonance inductor is connected to the secondary side of the transformer 6.

In a case in which a major portion or the entire inductance L of the necessary resonant inductor 42 is configured with a leakage inductance of the transformer 6, it is preferable that the leakage inductance between the primary windings 6A1 and 6A2 is reduced as much as possible so as to configure a winding configuration in which a leakage inductance can be produced between the primary winding 6A1 or 6A2 and the secondary winding 6B. Thus, surge voltage of the first and second switching devices 2A and 2B when are turned off can be reduced.

Figure 8:
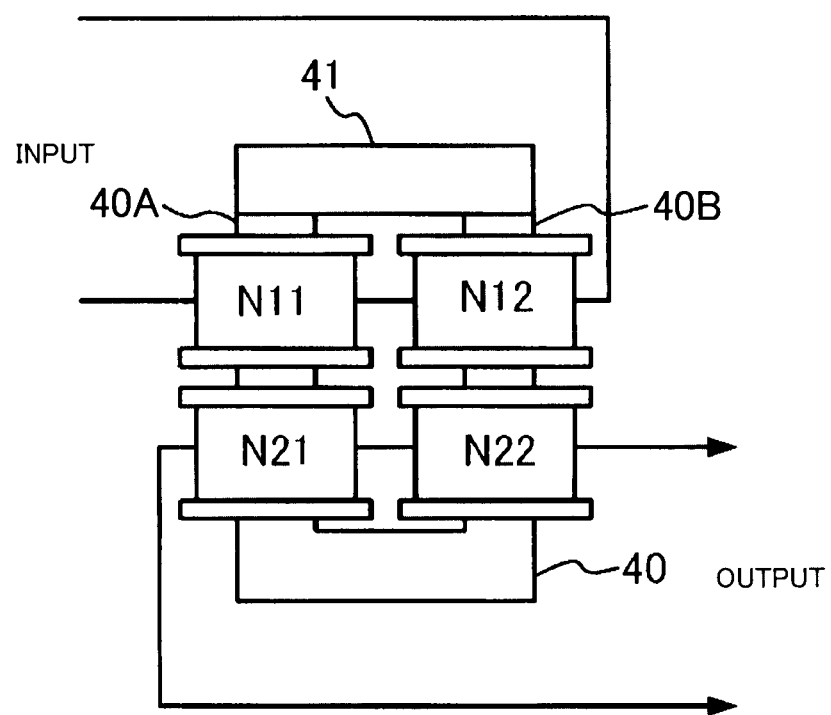
FIG. 8 is a diagram illustrating an example of a structure of a leakage transformer used for the series resonant converter shown in FIG. 7.
Figure 9A:
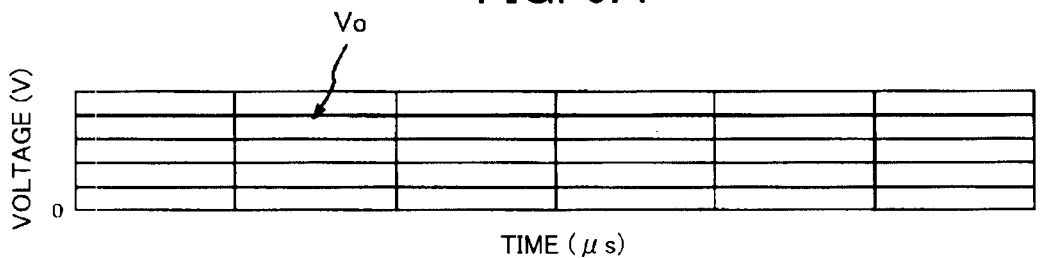
FIGS. 9A to 9D are waveform diagrams showing simulated waveforms of a series resonant converter of FIG. 1, respectively.
Figure 9B:
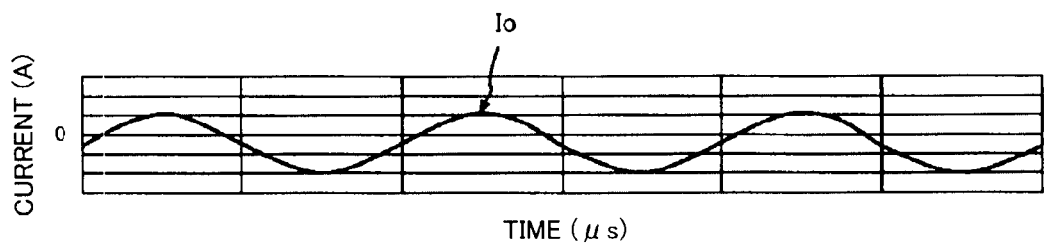
Figure 9C:
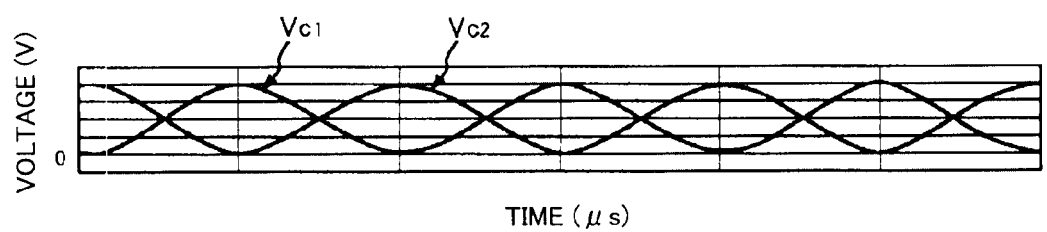
Figure 9D:
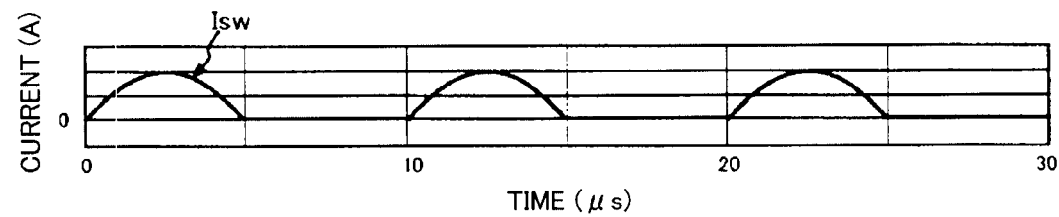

FIG. 8 shows a configuration example that can be used for the first to third embodiment of the present invention. The primary winding 6A is divided into N11 and N12 and the secondary winding 6B is divided into N21 and N22. Then, the windings N11 and N21 wound around one leg 40A of a U-shape core of a UT-shape iron core composed of a U-shape core 40 and an I-shape core 41, and the windings N12 and N22 are wound around the other one leg 40B. The winding N11 and N21, or N12 and N22 can be wound around so as not to be overlapped each other, and thus leakage inductance between those windings can be increased. An input side in FIG. 8 is connected with the inverter circuit 2, one end of an output side is connected to a connection point between the resonant capacitors 5A and 5B, and the other end of the output side is connected to a connection point of the diodes 12A and 12B of the unidirectional device unit 12 or a connection point of the FET 12C and the FET 12D.

As long as an inverter circuit includes at least two switching devices which are alternately turned on and off, there is no limitation for a circuit configuration of the present invention. More specifically, the inverter circuits of the full-bridge configurations using four switching devices shown in the first and second embodiment, the half-bridge configuration shown in the third configuration in which two switches are connected in series, the push-pull type circuit shown in the fourth embodiment and the like can be exemplified. It should be noted that, in a case in which feedback current flows in these inverter circuits from the resonant inductor to the input terminal side, it is preferable to configure a circuit in which a diode for feedback current is connected in parallel with a switching device.

Furthermore, in the second and third embodiments, as described above, even if the resonant inductor is connected in series with the secondary winding between the secondary winding of the transformer and the resonant capacitor, effects similar to the foregoing can be obtained. Moreover, in the first to fourth embodiments, the position of the resonant capacitor unit 5 may be replaced with that of the unidirectional device unit 12 so as to connect with the secondary winding 6B of the transformer 6. In the third embodiment shown in FIG. 6, the position of the arm in which the switching devices 2A and 2C are connected in series may be replaced with that of the arm in which the capacitors 2X and 2Y are connected in series. It should be noted that, in the resonant converter of the present invention, any configuration of the inverter circuit 2, the configuration of the resonant capacitor unit 5 and the unidirectional device unit 12 may be combined. In the fourth embodiment as well, a leakage inductance of the transformer 6 can be used, as a portion of or the overall inductance of the resonant induction device.

As described above, since the series resonant converter according to the present invention basically does not return electric charge energized in the resonant capacitor to the DC power supply, feedback current does not flow, which can reduce extra power loss. Furthermore, since the resonant capacitor connected in series to each other and the unidirectional devices connected in series to each other configures a voltage-doubler rectifier circuit in response to the amplitude of the output current, it is possible to output an output voltage which is nearly double the voltage of the secondary winding of the transformer.

It should be noted that the series resonant converter can be applied to a general installation device including a vacuum device and a communication power supply.

What is claimed is:

1. A series resonant converter, comprising:
an inverter circuit including at least a first switching device and a second switching device, each of the first and second switching devices being directly connected between two input terminals connecting DC power supply, the inverter circuit including a first feedback diode arranged in parallel with the first switching device and having a reversed polarity opposite to that of the first switching device and a second feedback diode arranged in parallel with the second switching device and having a reversed polarity opposite to that of the second switching device;
a transformer, having a primary winding and a secondary winding, connected to the inverter circuit;
a first resonant capacitor and a second resonant capacitor connected in series to each other between two output terminals, a connection point of the first resonant capacitor and the second resonant capacitor being connected to one end of the secondary winding of the transformer;
a first unidirectional device and a second unidirectional device connected in series to each other between the two output terminals, a connection point of the first unidirectional device and the second unidirectional device being connected to a second end of the secondary winding of the transformer; and
a resonant induction device that is placed between the inverter circuit and the first and second resonant capacitors, wherein
the first switching device and the second switching device are configured to be turned on and off alternately with a conversion frequency, and the inverter circuit being configured to convert DC power inputted from the two input terminals and supply a DC output voltage to the two output terminals via the transformer, a length of the on durations of the first switching device and the second switching device are fixed to about one half cycle of a series resonance frequency with which inductance of the resonant induction device and an additive capacitance which adds capacitance of the first resonant capacitor and the second resonant capacitor are resonated in series,
the conversion frequency used for the inverter circuit being below the series resonance frequency, and
the DC output voltage being set equal to double the voltage of the DC power supply, and a resonance impedance $(L/C)^{1/2}$ determined by the inductance of the resonant induction device and additive capacitance being selected so that voltages of the first resonant capacitor and the second resonant capacitor are reverse phases to each other, and change up to voltage of amplitude, which is equal to the DC output voltage, from 0 V.

2. The series resonant converter according to claim 1, wherein
the inverter circuit comprises a first feedback diode arranged in parallel with the first switching device and having a reversed polarity opposite to that of the first switching device, and a second feedback diode arranged in parallel with the second switching device and having a reversed polarity opposite to that of the second switching device.

3. The series resonant converter according to claim 1, further comprising:
at least one reverse charge control device operative to prevent reverse direction charge of the first resonant capacitor or the second resonant capacitor, the reverse charge control device being connected in parallel with the first resonant capacitor or the second resonant capacitor, respectively.

4. The series resonant converter according to claim 1, wherein
the inverter circuit comprises any of the following circuit configurations of:
a half-bridge circuit in which the first switching device and the second switching device are connected in series;
a full-bridge circuit connected in parallel with two switching device arms in which the first switching device and the second switching device are connected in series; and
a push-pull type circuit connecting the first switching device with the second switching device between the input terminal and two terminals of the primary winding of the transformer in which an intermediate tap is provided.

5. The series resonant converter according to claim 1, wherein
inductance of the resonant induction device, and capacitance of the first resonant capacitor and capacitance of the second resonant capacitor are selected so that the inductance of the resonant induction device and additive capacitance which adds the capacitance of the first resonant capacitor and the second resonant capacitor are resonated in series at a resonance frequency which is substantially equal to a conversion frequency of the inverter circuit.

6. The series resonant converter according to claim 1, wherein
the first switching device and the second switching device operate at a conversion frequency of the inverter which is below a resonance frequency fixed by the resonant induction device, the first resonant capacitor and the second resonant capacitor.

7. The series resonant converter according to claim 1, wherein
the first unidirectional device comprises a first field-effect transistor and the second unidirectional device comprises a second field-effect transistor,
the first field-effect transistor being synchronized with the first switching device of the inverter circuit and turns ON simultaneously therewith, and
the second field-effect transistor configured to perform synchronous rectification by turning on to be synchronous with the second switching device of the inverter circuit.

8. The series resonant converter according to claim 1, further comprising:
a smoothing capacitor, which has a higher capacitance than the first resonant capacitor or the second resonant capacitor, connected in parallel with a series circuit of the first unidirectional device and the second unidirectional device.

9. The series resonant converter according to claim 1, further comprising:
a resonant inductor configured to impart at least a portion of the inductance of the resonant induction device connected in series with the first winding or the second winding of the transformer.

10. The series resonant converter according to claim 1, wherein
at least a portion of the inductance of the resonant induction device comprises a leakage inductance caused by leakage flux between the first winding and the second winding of the transformer.

11. The series resonant converter according to claim 1, wherein
the first switching device or the second switching device are turned off after energy accumulated in the resonant induction device is discharged.

12. The series resonant converter according to claim 2, wherein
energy accumulated in the resonant induction device is supplied to the output terminal via one of the first feedback diode or the second feedback diode in the state where the first switching device or the second switching device of the inverter circuit are turned off, and
energy accumulated in the resonant induction device is returned to the input terminal and supplied to the output terminal via the first feedback diode or the second feedback diode in the state where the first switching device and the second switching device are simultaneously turned off.

13. The series resonant converter according to claim 1, wherein
the voltage of the DC power supply at the input terminals is applied as reverse voltage to the first feedback diode or the second feedback diode, thereby preventing recovery current from flowing through the first feedback diodes or the second feedback diode.

14. The series resonant converter according to claim 1, wherein
energy accumulated in the resonant induction device is supplied to the output terminal via one of the first feedback diode or the second feedback diode in the state where the first switching device or the second switching device of the inverter circuit is turned off, and
energy accumulated in the resonant induction device is returned to the input terminal and supplied to the output terminal via the first feedback diode or the second feedback diode in the state where the first switching device and the second switching device are simultaneously turned off.

* * * * *